United States Patent
Fan et al.

(10) Patent No.: US 11,030,437 B2
(45) Date of Patent: Jun. 8, 2021

(54) LIVENESS DETECTION METHOD AND LIVENESS DETECTION SYSTEM

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Haoqiang Fan, Beijing (CN); Qi Yin, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 15/596,730

(22) Filed: May 16, 2017

(65) Prior Publication Data

US 2017/0345146 A1    Nov. 30, 2017

(30) Foreign Application Priority Data

May 30, 2016 (CN) .......................... 201610371250.5

(51) Int. Cl.
G06K 9/00 (2006.01)
G06T 7/33 (2017.01)

(52) U.S. Cl.
CPC ............ *G06K 9/00228* (2013.01); *G06T 7/33* (2017.01); *G06T 2207/10024* (2013.01); *G06T 2207/10028* (2013.01); *G06T 2207/30201* (2013.01)

(58) Field of Classification Search
None
See application file for complete search history.

(56) References Cited

U.S. PATENT DOCUMENTS

2014/0226872 A1    8/2014    Amano

FOREIGN PATENT DOCUMENTS

| CN | 104766072 | 7/2015 |
|----|-----------|--------|
| CN | 105335722 | 2/2016 |

(Continued)

OTHER PUBLICATIONS

Kose, Neslihan, and Jean-Luc Dugelay. "Shape and Texture Based Countermeasure to Protect Face Recognition Systems against Mask Attacks." Computer Vision and Pattern Recognition Workshops (CVPRW), 2013 IEEE Conference on. IEEE, 2013. (Year: 2013).*

(Continued)

*Primary Examiner* — Vu Le
*Assistant Examiner* — Tracy Mangialaschi
(74) *Attorney, Agent, or Firm* — Hamre, Schumann, Mueller & Larson, P.C.

(57) ABSTRACT

The application provides a liveness detection method and a liveness detection system. The liveness detection method includes: obtaining first and second face image data of an object to be detected, and at least one of the first and the second face image data being a depth image; determining a first face region and a second face region, determining whether the first and the second face regions correspond to each other, and extracting, when it is determined that the first and the second face region corresponds to each other, a first and a second face image from the first and the second face region respectively; determining a first classification result for the extracted first face image and a second classification result for the extracted second face image; and determining, based on the first classification result and the second classification result, a detection result for the object to be detected.

12 Claims, 10 Drawing Sheets

(56) References Cited

FOREIGN PATENT DOCUMENTS

| CN | 105447483 | 3/2016 |
|---|---|---|
| WO | 2010099475 | 9/2010 |

OTHER PUBLICATIONS

Yoshino, Mineo, et al. "Computer-assisted facial image identification system using a 3-D physiognomic range finder." Forensic science international 109.3 (2000): 225-237. (Year: 2000).*
Chang, K. B. K. I., Kevin Bowyer, and Patrick Flynn. "Face recognition using 2D and 3D facial data." ACM Workshop on Multimodal User Authentication. 2003. (Year: 2003).*
Soltana, W. Ben, et al. "Comparison of 2D/3D features and their adaptive score level fusion for 3D face recognition." 3D data processing, visualization and transmission (3DPVT) (2010): 1-8. (Year: 2010).*
Chrzan, Bc Martin. "Liveness detection for face recognition." Master's thesis (2014). (Year: 2014).*
First Office Action, issued in the corresponding Chinese patent application No. 201610371250.5, dated Jul. 3, 2019, 26 pages.

* cited by examiner

LIVENESS DETECTION METHOD AND LIVENESS DETECTION SYSTEM

CROSS-REFERENCE TO RELATED APPLICATION

This application claims priority to Chinese patent application No. 201610371250.5 filed on May 30, 2016, the entire contents of which are incorporated herein by reference.

TECHNICAL FIELD

The present disclosure relates to the field of liveness detection, and more particularly, to a liveness detection method and a liveness detection system, which are capable of implementing liveness detection on a human body.

BACKGROUND

At present, face recognition systems are more and more applied to scenarios that require an ID authentication in fields like security, finance etc., such as remote bank account opening, access control system, remote transaction operating verification etc. In these application fields with high security level, in addition to ensuring that a face similarity of an authenticatee matches with library data stored in a database, first, it is required that the authenticatee is a legitimate biological living body. That is to say, the face recognition system needs to be able to prevent an attacker from attacking using pictures, 3D face models, or masks and so on.

The method for solving the above problem is usually called liveness detection, which aims to determine whether an obtained physiological feature comes from a living, in-field, real person. Liveness verification schemes acknowledged as mature do not exist among technology products on market, conventional liveness detection techniques either depend on specific hardware devices, for example, image acquisition devices such as an infrared came, a depth camera or a complex active light source such as a DLP projector, or can prevent only simple attacks from static pictures. For example, liveness detection performed by using merely a two-dimensional image usually requires a person being tested to make an action for cooperation, so it has bad user experience. And liveness detection performed by using merely a depth image cannot efficiently prevent an attack from masks.

SUMMARY

In view of the above problem, the present disclosure is proposed. The present disclosure provides a liveness detection method capable of implementing liveness detection on a human body, and a liveness detection system that employs the liveness detection method, wherein a two-dimensional image and a depth image are used in combination, effectively preventing non-living body attackers such as masks, screens and so on is implemented, so that accuracy of the face recognition systems, usability, and user experience are all improved.

According to an embodiment of the present disclosure, there is provided a liveness detection method, comprising: obtaining first face image data and second face image data of an object to be detected, the first face image data and the second face image data being acquired respectively by a first image acquisition unit and a second image acquisition unit, and at least one of the first face image data and the second face image data being a depth image; determining a first face region where a first face resides in the first face image data and a second face region where a second face resides in the second face image data, determining whether the first face region and the second face region correspond to each other, and extracting, when it is determined that the first face region and the second face region correspond to each other, a first face image and a second face image from the first face region and the second face region that correspond to each other, respectively; determining a first classification result for the extracted first face image and a second classification result for the extracted second face image by using a first classification unit for the first face image data and a second classification unit for the second face image data; and determining, based on the first classification result and the second classification result, a detection result for the object to be detected.

In addition, in the liveness detection method according to an embodiment of the present disclosure, the first image acquisition unit is a depth image acquisition unit, and the second image acquisition unit is a two-dimensional image acquisition unit.

In addition, in the liveness detection method according to an embodiment of the present disclosure, determining a first face region where a first face in the first face image data resides and a second face region where a second face in the second face image data resides comprises: mapping, based on pixel position mapping relationship between the first face image data and the second face image data, the first face image data into first mapped face image data in a pixel coordinate where the second face image data resides; and determining, by using a face detector that is trained in advance, a third face region in the first mapped face image data and the second face region in the second face image data, and determining, based on the third face region in the first mapped face image data, the first face region in the first face image data.

In addition, in the liveness detection method according to an embodiment of the present disclosure, pixel position mapping between the first face image data and the second face image data is determined based on a relative position between the first image acquisition unit and the second image acquisition unit.

In addition, in the liveness detection method according to an embodiment of the present disclosure, determining whether the first face region and the second face region correspond to each other comprises: selecting a specific pixel dot in the first face region according to pixel position mapping between the first face image data and the second face image data; determining whether the specific pixel dot resides in the second face region; and determining that the first face region and the second face region correspond to each other when the specific pixel dot resides in the second face region.

In addition, the liveness detection method according to an embodiment of the present disclosure further comprises training the first classification unit and the second classification unit in advance by using a plurality of different types of sample images, wherein a weight of each of the plurality of different types of sample images with respect to the first classification unit and the second classification unit is adjusted dynamically.

In addition, in the liveness detection method according to an embodiment of the present disclosure, determining, based on the first classification result and the second classification result, a detection result for the object to be detected comprises: multiplying the first classification result and the second classification result together to obtain an integrated classification result; and comparing the integrated classification result to a predetermined threshold, indicating that the liveness detection is passed if the integrated classification result is larger than or equal to the predetermined threshold, the first classification result and the second classification result are a value between 0 and 1 each.

In addition, in the liveness detection method according to an embodiment of the present disclosure, determining, based on the first classification result and the second classification result, a detection result for the object to be detected further comprises: indicating that the liveness detection is passed when the integrated classification result in a predetermined time period is larger than or equal to the predetermined threshold.

According to another embodiment of the present disclosure, there is provided a liveness detection system, comprising: an image data acquisition module for acquiring first face image data and second face image data of an object to be detected; a liveness detection module for performing liveness detection based on the first face image data and the second face image data, and including: a face region correspondence determination module for determining a first face region where a first face resides in the first face image data and a second face region where a second face resides in the second face image data, and determining whether the first face region and the second face region correspond to each other; a face image extraction module for extracting, when it is determined that the first face region and the second face region correspond to each other, a first face image and a second face image from the first face region and the second face region that correspond to each other; a first classification unit for determining a first classification result for the first face image; a second classification unit for determining a second classification result for the second face image; and a classification result detection unit for determining a detection result for the object to be detected based on the first classification result and the second classification result.

In addition, the liveness detection system according to another embodiment of the present disclosure further comprises a first image acquisition unit for acquiring the first face image data and a second image acquisition unit for acquiring the second face image data, respectively.

In addition, in the liveness detection system according to another embodiment of the present disclosure, the first image acquisition unit is a depth image acquisition unit, and the second image acquisition unit is a two-dimensional image acquisition unit.

In addition, in the liveness detection system according to another embodiment of the present disclosure, the face region correspondence determination unit maps, based on pixel position mapping relationship between the first face image data and the second face image data, the first face image data into first mapped face image data in a pixel coordinate where the second face image data resides, determines a third face region in the first mapped face image data and the second face region in the second face image data, and determines the first face region in the first face image data based on the third face region in the first mapped face image data.

In addition, in the liveness detection system according to another embodiment of the present disclosure, wherein the face region correspondence determination unit determines pixel position mapping between the first face image data and the second face image data based on a relative position between the first image acquisition unit and the second image acquisition unit.

In addition, in the liveness detection system according to another embodiment of the present disclosure, the face region correspondence determination unit is for: selecting a specific pixel dot in the first face region; determining whether the specific pixel dot resides in the second face region according to pixel position mapping between the first face image data and the second face image data; and determining that the first face region and the second face region correspond to each other when the specific pixel dot resides in the second face region.

In addition, in the liveness detection system according to another embodiment of the present disclosure, the first classification unit and the second classification unit are trained in advance by using a plurality of different types of sample images, a weight of each of the plurality of different types of sample images with respect to the first classification unit and the second classification unit is adjusted dynamically In addition, in the liveness detection system according to another embodiment of the present disclosure, the classification detection unit performs the following operations: multiplying the first classification result and the second classification result together to obtain an integrated classification result; and comparing the integrated classification result to a predetermined threshold, indicating that the liveness detection is passed if the integrated classification result is larger than or equal to the predetermined threshold, the first classification result and the second classification result being a value between 0 and 1 each.

In addition, in the liveness detection system according to another embodiment of the present disclosure, the classification result detection unit determines whether the integrated classification result in a predetermined time period is larger than or equals to the predetermined threshold, and indicates that the liveness detection is passed when the integrated classification result in the predetermined time period is larger than or equal to the predetermined threshold.

According to yet another embodiment of the present disclosure, there is provided a computer program product, comprising a computer-readable medium on which computer program instructions configured to execute the following steps when being run by a computer are stored:

obtaining first face image data and second face image data of an object to be detected, the first face image data and the second face image data being acquired respectively by a first image acquisition unit and a second image acquisition unit, and at least one of the first face image data and the second face image data being a depth image;

determining a first face region where a first face resides in the first face image data and a second face region where a second face resides in the second face image data, determining whether the first face region and the second face region correspond to each other, and extracting, when it is determined that the first face region and the second face region correspond to each other, a first face image and a second face image from the first face region and the second face region that correspond to each other, respectively;

determining a first classification result for the extracted first face image and a second classification result for the extracted second face image by using a first classification unit for the first face image data and a second classification unit for the second face image data; and determining, based on the first classification result and the second classification result, a detection result for the object to be detected.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments are only parts of the embodiments of the present disclosure, rather than all of the embodiments of the present disclosure, it should be understood that the present disclosure is not limited to the exemplary embodiments described herein. All other embodiments obtained by those skilled in the art without paying inventive efforts fall into the protection scope of the present disclosure.

Hereinafter, preferred embodiments of the present disclosure will be described in detail with reference to the accompanying drawings.

Figure 1:
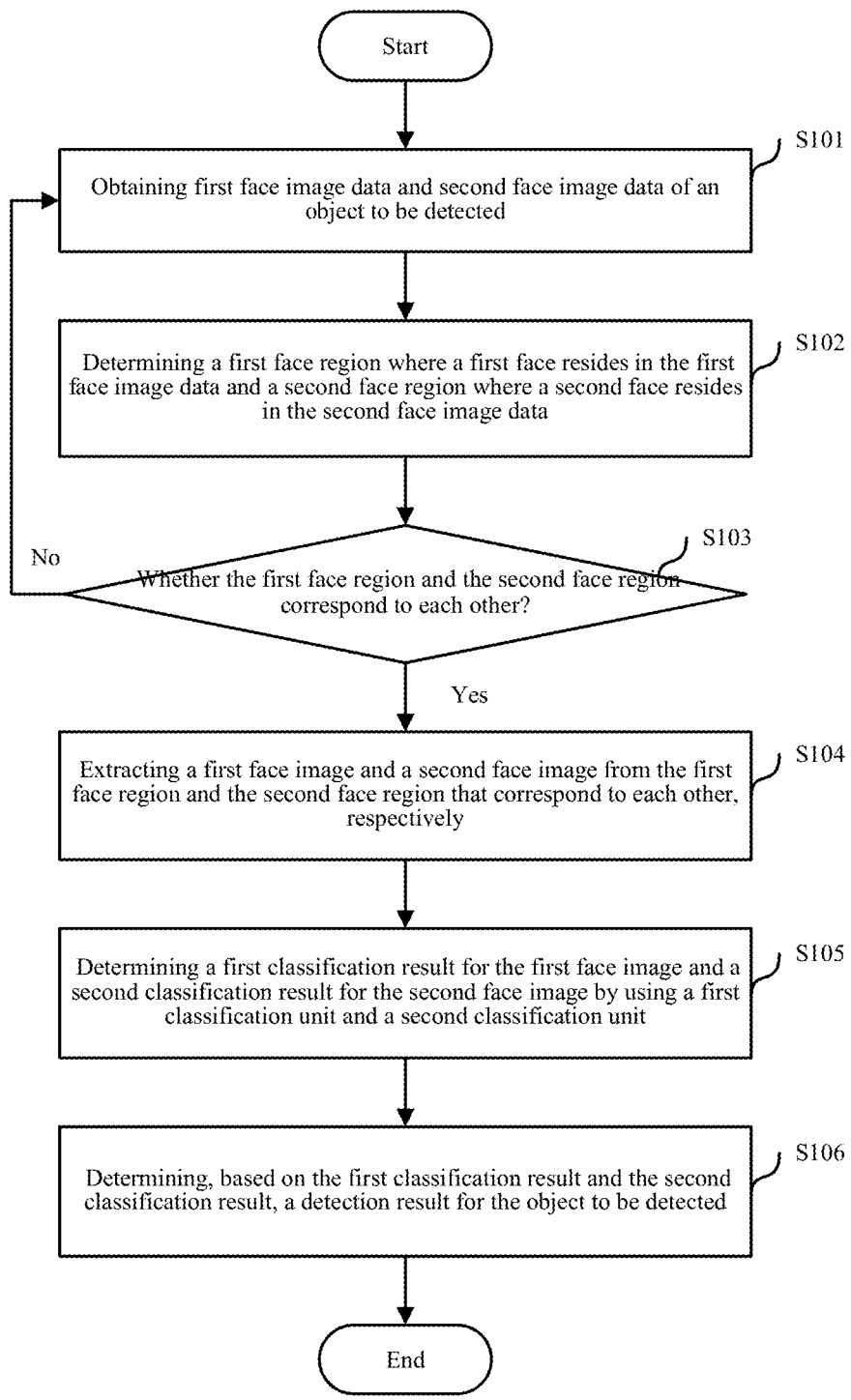
FIG. 1 is a flowchart briefly illustrating the liveness detection method according to an embodiment of the present disclosure.

FIG. 1 is a flowchart briefly illustrating the liveness detection method according to an embodiment of the present disclosure. As shown in FIG. 1, the liveness detection method according to an embodiment of the present disclosure comprises the following steps.

In step S101, first face image data and second face image data of an object to be detected are obtained. In an embodiment of the present disclosure, the first face image data and the second face image data are acquired respectively by a first image acquisition unit and a second image acquisition unit, and at least one of the first face image data and the second face image data is a depth image. That is to say, in an embodiment of the present disclosure, one image acquisition unit of the first image acquisition unit and the second image acquisition unit is configured with an image acquisition unit such as an RGB camera or an infrared camera, whereas the other image acquisition unit of the first image acquisition unit and the second image acquisition unit is configured with a structured light depth camera or a Time of Flight (TOF) depth camera. Thereafter, the processing proceeds to step S102.

In step S102, a first face region where a first face resides in the first face image data and a second face region where a second face resides in the second face image data are determined. For example, in the case where the first image acquisition unit is a depth image acquisition unit and the second image acquisition unit is a two-dimensional image acquisition unit, the first face region is a region where a first face resides in depth face image data, and the second face region is a region where a second face resides in two-dimensional face image data. Thereafter, the processing proceeds to step S103.

In step S103, it is determined whether the first face region and the second face region correspond to each other. As described above, since the first face region is a face region in the first face image data acquired by the depth image acquisition unit and the second face region is a face region in the second face image data acquired by the two-dimensional image acquisition unit, thus in order to determine whether the two correspond to each other, it needs to map the face image data acquired by one image acquisition unit to a coordinate system where the other image acquisition unit resides, so that correspondence relationship between the two can be determined in the same coordinate system.

In a mapping process which will be described below in detail with reference to the drawings, the first face image data acquired by the first image acquisition unit (the depth image acquisition unit) is mapped to first mapped face image data in a pixel coordinate where the second face image data acquired by the second image acquisition unit (the two-dimensional image acquisition unit) resides. As will be readily appreciated, the present disclosure is not limited thereto, instead, the present disclosure includes mapping the second face image data acquired by the second image acquisition unit (the two-dimensional image acquisition unit) to a pixel coordinate where the first face image data acquired by the first image acquisition unit (the depth image acquisition unit) resides. Next, the mapping process and the process of determining correspondence between the two-dimensional face region and the depth face region after mapping will be described in detail with reference to the drawings.

If a negative result is obtained in step S103, that is, it is determined that the first face region and the second face region do not correspond, the processing returns to step S101 to continuously obtain the first face image data and the second face image data of the object to be detected. In an embodiment of the present disclosure, that the first face region and the second face region do not correspond includes: one or two of the first face image data and the second face image data includes no face region, and after the first face region in the first face image data and the second face region in the second face image data are transformed into the same pixel coordinate, the two have a difference that exceeds a predetermined threshold in a specific position in the coordinate.

Contrarily, if a positive result is obtained in step S103, that is, it is determined that the first face region and the second face region correspond, then the processing proceeds to step S104.

In step S104, the first face image and the second face image are extracted respectively from the first face region and the second face region that correspond to each other. In an embodiment of the present disclosure, the first face image and the second face image come from different types of face image data (such as two-dimensional face image data or depth face image data) Thereafter, the proceeding proceeds to step S105.

In step 105, a first classification result for the first face image is determined by using a first classification unit and a second classification result for the second face image is determined by using a second classification unit. In an embodiment of the present disclosure, a corresponding classifier (e.g. a classifier based on a convolution neural network) is trained in advance for a different type of image, so as to extract the first face image and the second face image in the first face region and the second face region that come from different types of image, and output a first classification result and a second classification result. Thereafter, the processing proceeds to step S106.

In step S106, a detection result for the object to be detected is determined based on the first classification result and the second classification result. In an embodiment of the present disclosure, the classifier that is trained in advance outputs a classification result between 0 and 1 with respect to an inputted face image. 0 indicates that the face image is a non-living body attacker such as a picture, a screen, a mask etc., 1 indicates that the face image is a normal face. The closer to 1 the classification result is, it indicates that the higher the probability that the face image is a normal face is. As will be further described in detail with reference to the drawings, in an embodiment of the present disclosure, the detection result for the object to be detected is determined by comprehensively considering classification results from different classifiers for different types of image. Further, in an embodiment of the present disclosure, classification results from different classifiers for different types of image are multiplied, a product is regarded as an integrated classification result. When one or more of the results outputted from different classifiers are 0, i.e., one or more of a plurality of classifiers indicate that the inputted face image is a non-living attacker, it is obtained that the integrated classification result is 0, which indicates that the detection result for the object to be detected is a non-living attacker; and when the integrated classification result is not less than a predetermined threshold, it is determined that the object to be detected passes the liveness detection. In addition, in another embodiment of the present disclosure, an integrated classification result in predetermined successive image frames may also be considered, and only when the integrated classification result in predetermined successive image frames indicates that the liveness detection is passed, it is determined that the object to be detected passes the liveness detection. As will be readily appreciated, when comprehensively considering classification results from different classifiers for different types of image, a different predetermined threshold and a different number of predetermined successive image frames may be set according to a security level in a detection scenario.

The liveness detection method according to an embodiment of the present disclosure as described above first determines correspondence of face images of the object to be detected as acquired in different types of image acquisition units (e.g., a depth image acquisition unit, a two-dimensional image acquisition unit (an RGB image acquisition unit and an infrared image acquisition unit)), and in the case where face images of the object to be detected as acquired in different types of image acquisition units correspond, said method further uses face image classifiers are trained in advance for different types of face image to output classification results, and comprehensively considers the classification results outputted from different classifiers for different types of image to determine the detection result for the object to be detected. In this way, the liveness detection method according to an embodiment of the present disclosure has higher detection efficiency, and since detection properties of both the depth image and the two-dimensional image are combined, thus a non-living attacker such as a mask, a screen etc. can be detected efficiently without requiring the user to cooperate actively.

Hereinafter, a liveness detection system that executes the liveness detection method will be further described with reference to FIG. 2.

Figure 2:
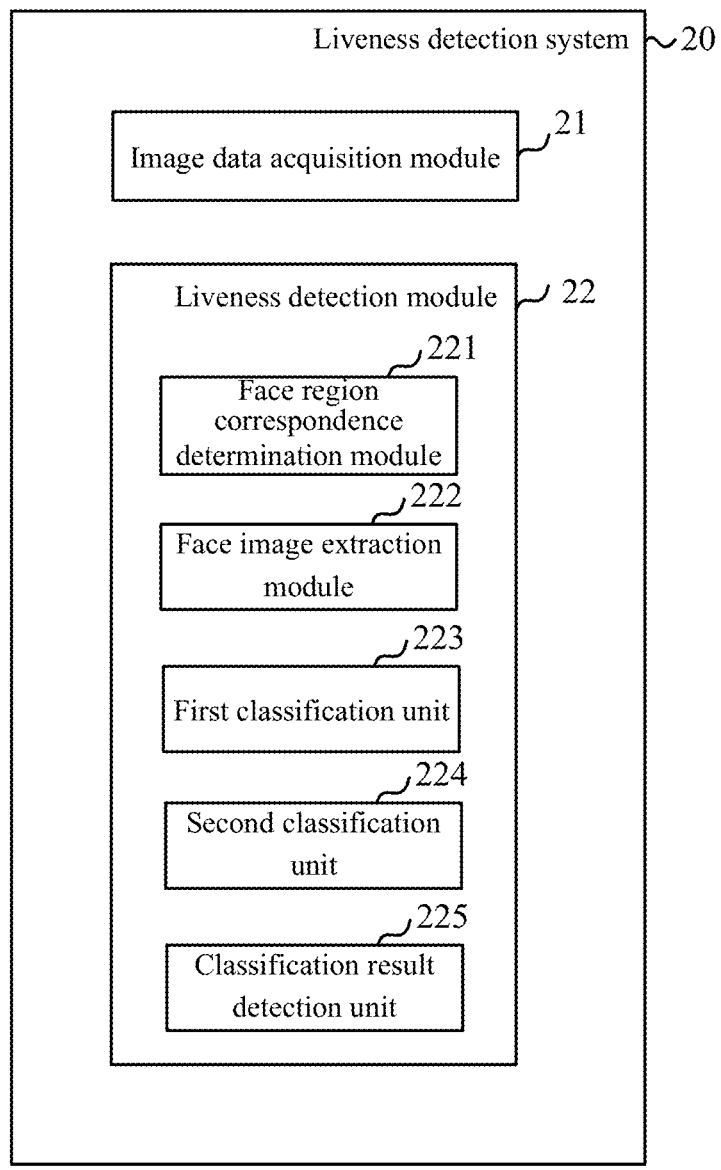
FIG. 2 is a functional block diagram illustrating the liveness detection system according to an embodiment of the present disclosure.

FIG. 2 is a functional block diagram illustrating the liveness detection system according to an embodiment of the present disclosure. As shown in FIG. 2, the liveness detection system 20 according to an embodiment of the present disclosure comprises an image data acquisition module 21 and a liveness detection module 22.

Specifically, the image data acquiring module 21 is for acquiring first face image data and second face image data of an object to be detected. In an embodiment of the present disclosure, the first face image data is acquired by a first image acquisition unit and the second face image is acquired by a second image acquisition unit (not shown), and at least one of the first a first face image data and the second face image data is a depth image. In an embodiment of the present disclosure, the first image acquisition unit and the second image acquisition unit (not shown) may be configured in the liveness detection system 20. Alternatively, the first image acquisition unit and the second image acquisition unit (not shown) may be configured outside the liveness detection system 20 and physically separated from the liveness detection system 20. Further, an embodiment of the present disclosure is not limited to including the first image acquisition unit and the second image acquisition unit (not shown), instead, an embodiment of the present disclosure may include more than two image acquisition units. For example, an embodiment of the present disclosure may include a first image acquisition unit (a depth image acquisition unit), a second image acquisition unit (an RGB image acquisition unit), and a third image acquisition unit (an infrared image acquisition unit), wherein in the case of adopting the infrared image acquisition unit, an infrared LED for light filling may be further configured. Further, the image data acquisition module 21 may be physically separated from, or physically located on the same position or within the same housing together with the liveness detection module 22 that is provided subsequently. In the case where the image data acquisition module 21 is physically separated from the liveness detection module 22 that is provided subsequently, the image data acquisition module 21 further transmits, in a wired or wireless manner, first image data and second image data acquired by the image data acquisition module 21 to the module that is provided subsequently. In the case where the image data acquisition module 21 is physically located on the same position or within the same housing together with the liveness detection module 22 that is provided subsequently, the image data acquisition module 21 further transmits, via an internal bus, depth video data acquired by the image data acquisition module 21 to the module that is provided subsequently. Prior to transmitting the first face image data and the second face image data in a wired or wireless manner or via a bus, it is possible to encode them with a predetermined format and compress them as an image data packet, so as to reduce traffic and bandwidth that are required by the transmission.

The liveness detection module 22 is for performing liveness detection based on the first face image data and the second face image data. The liveness detection module 22 further comprises a face region correspondence determination module 221, a face image extraction module 222, a first classification unit 223, a second classification unit 224, and a classification result detection unit 225.

The face region correspondence determination module 221 is for determining a first face region where a first face resides in the first face image data and a second face region where a second face resides in the second face image data, and determining whether the first face region and the second face region correspond to each other. More specifically, the face region correspondence determination module 221 maps, based on pixel position mapping relationship between the first face image data and the second face image data, the first face image data into first mapped face image data in a pixel coordinate where the second face image data resides, determines, by using a face detector that is trained in advance, a third face region in the first mapped face image data and the second face region in the second face image data, and determines, based on the third face region in the first mapped face image data, the first face region in the first face image data. In an embodiment of the present disclosure, the face region correspondence determination module 221 selects a specific pixel dot in the third face region (a central pixel dot in the third face region), determines whether the specific pixel dot resides in the second face region, and determines that the first face region and the second face region correspond to each other when the specific pixel dot resides in the second face region.

The face image extraction module 222 is extracting, when it is determined that the first face region and the second face region correspond to each other, a first face image and a second face image from the first face region and the second face region that correspond to each other, respectively.

The first classification unit 223 is for determining a first classification result for the first face image, and the second classification unit 224 is for determining a second classification result for the second face image. As will be readily appreciated, an embodiment of the present disclosure is not limited to two classification units, instead, corresponding classification units may be configured according to the number of types of the image acquisition units. In the case where a first image acquisition unit (a depth image acquisition unit), a second image acquisition unit (an RGB image acquisition unit), and a third image acquisition unit (an infrared image acquisition unit) are configured as described above, the corresponding first to third classification units may be configured.

More specifically, in an embodiment of the present disclosure, the first classification unit 223 and the second classification unit 224 are classifiers based on a convolution neural network. The first classification unit 223 and the second classification unit 224 are trained in advance by using a plurality of different types of sample images. In a neural network training method where an RGB image, an infrared image, and a depth image are converged, since a negative sample of a different prosperity has a different capability of being differentiated in an image in a different form (e.g., it is hard to differentiate a picture in the RGB image from a real person, but it is easily to differentiate it from a real person in the infrared image or the RGB image), thus a dynamic weight adjusting method is adopted. That is, in the process of training, a weight of each of the plurality of different types of sample images with respect to the first classification unit 223 and the second classification unit 224 is adjusted dynamically.

For example, it is supposed that $I_i^a$ is an image of an i-th trained sample in a form a (a=depth, infrared, or RGB etc.). $L_i$ is a classification value regarding that this sample is a real person (1) or an attacker (0). A parameter in a neural network module may be abstracted as a weight vector W, as to each data form (depth, infrared, or RGB etc.), a weight of the corresponding neural network is $W_a$. $f_a(x, W_a)$ is used to indicate an output for an input x in a network with a data form a.

It is defined that a "target function" is $$S = \Sigma\Sigma b_i^a J(f_a(I_i^a, W_a), L_i)$$  Expression (1)

where J is a certain error metric function, for example, $J(x,y) = y \log(x) + (1-y)\log(1-x)$, $b_i$ is a relative weight of each sample.

When using the gradient descent algorithm to perform training, updating is performed each time:

$$W_a \leftarrow +\delta \partial S/\partial W_a$$  Expression (2)

where δ is a step length.

In order to improve learning effect in the case of converging a plurality of forms, $b_i$ is dynamically adjusted every certain number of steps $$b_i^a \leftarrow \frac{1/J(f_a(I_i^a, W_a), L_i)}{\sum_{1/J} (f_{a'}(I_i^{a'}, W_{a'}), L_i)}$$  Expression (3)

where $I_i^{a'}$ indicates an image of an i-th trained sample in each form a' (a'=depth, infrared, or RGB etc.), $f_{a'}(I_i^{a'}, W_{a'})$ indicates an output from a neural network of each form (a') with respect to an inputted trained sample $I_i^{a'}$; thereby, a weight of each sample is dynamically adjusted according to a proportion of an error metric function corresponding to a trained sample of each data form in error metric functions corresponding to trained samples of all data forms, thus, as for each different type of sampled image, weight of a neural network (e.g., a first classification unit and a second classification unit etc.) applied to a corresponding type of sampled image is dynamically adjusted, respectively.

By means of adjusting the weight, each sample is enabled to focus on a data form in which each sample is most likely to be differentiated, which improves the training effect.

The classification result detection unit 225 is for determining a detection result for the object to be detected based on the first classification result and the second classification result. In an embodiment of the present disclosure, the classification result detection unit 225 multiplies the first classification result and the second classification result together to obtain an integrated classification result, compares the integrated classification result to a predetermined threshold, and indicates that the liveness detection is passed if the integrated classification result is larger than or equal to the predetermined threshold, wherein the first classification result and the second classification result are a value between 0 and 1 each. In another embodiment of the present disclosure, the classification result detection unit 225 determines whether the integrated classification result in a predetermined time period is larger than or equal to the predetermined threshold and indicates that the liveness detection is passed when the integrated classification result in a predetermined time period is larger than or equal to the predetermined threshold.

In the above, the liveness detection method and the liveness detection system that executes the liveness detection method according to the embodiments of the present disclosure have been described with reference to FIGS. 1 and 2. Next, the liveness detection method according to an embodiment of the present disclosure will be further described in detail below with reference to flowcharts and schematic diagrams.

First, the process of determining correspondence between a two-dimensional face region and a depth face region in the liveness detection process according to an embodiment of the present disclosure will be described with reference to FIGS. 3 to 5C.

Figure 3:
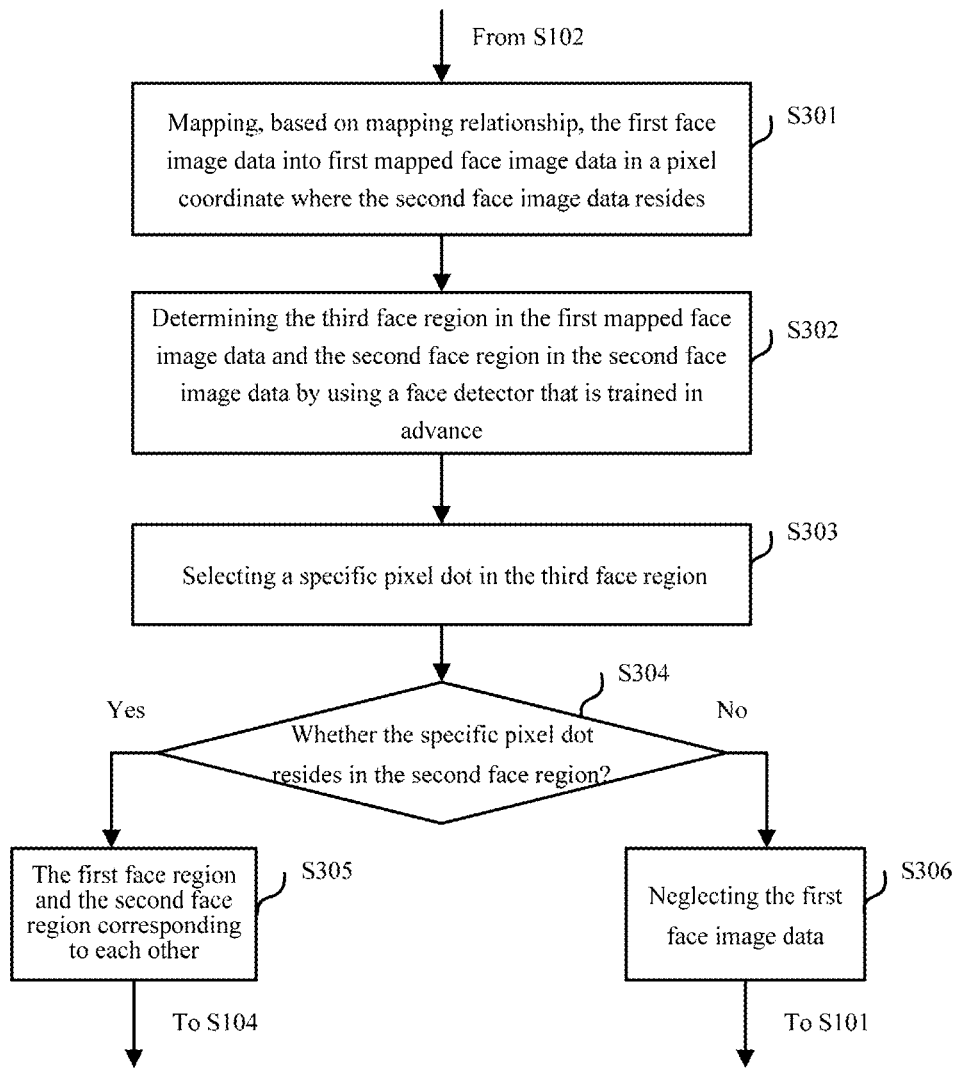
FIG. 3 is a flowchart further illustrating the process of determining correspondence between a two-dimensional face region and a depth face region in the liveness detection process according to an embodiment of the present disclosure.
Figure 4A:
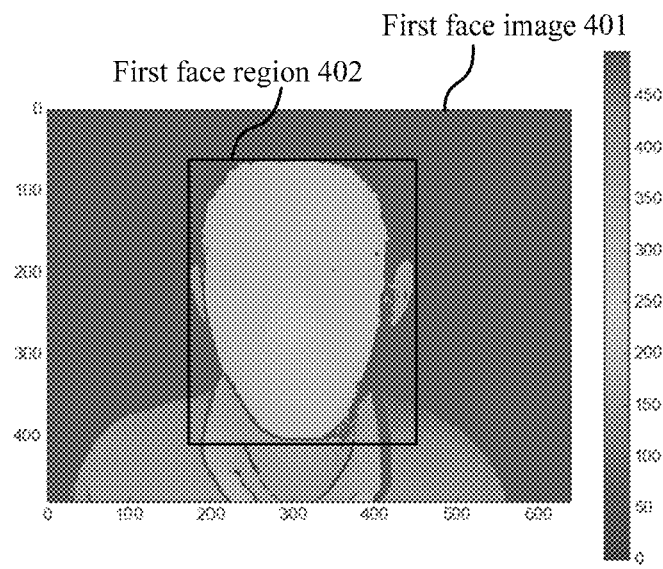
FIGS. 4A to 4C are a first schematic diagram illustrating the process of determining correspondence in the liveness detection method according to an embodiment of the present disclosure each.
Figure 4B:
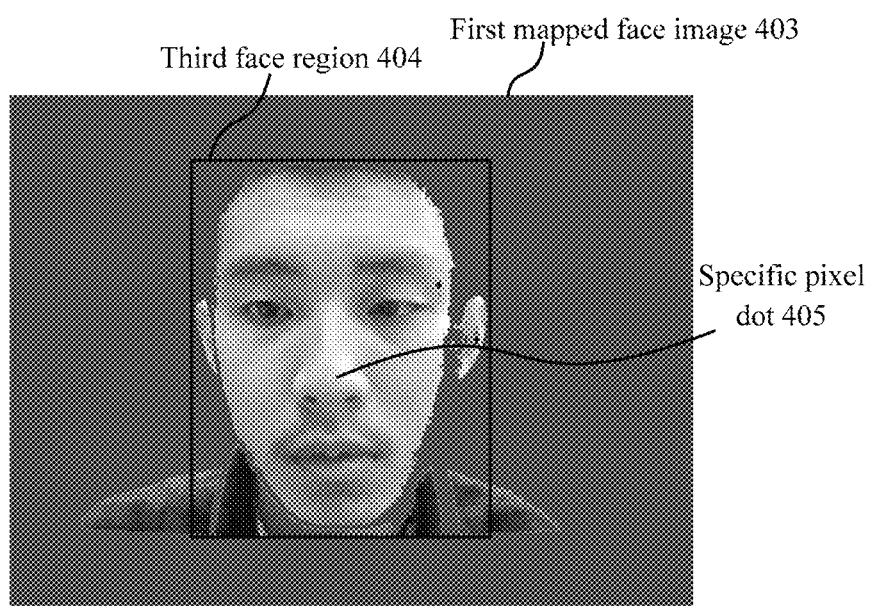
Figure 4C:
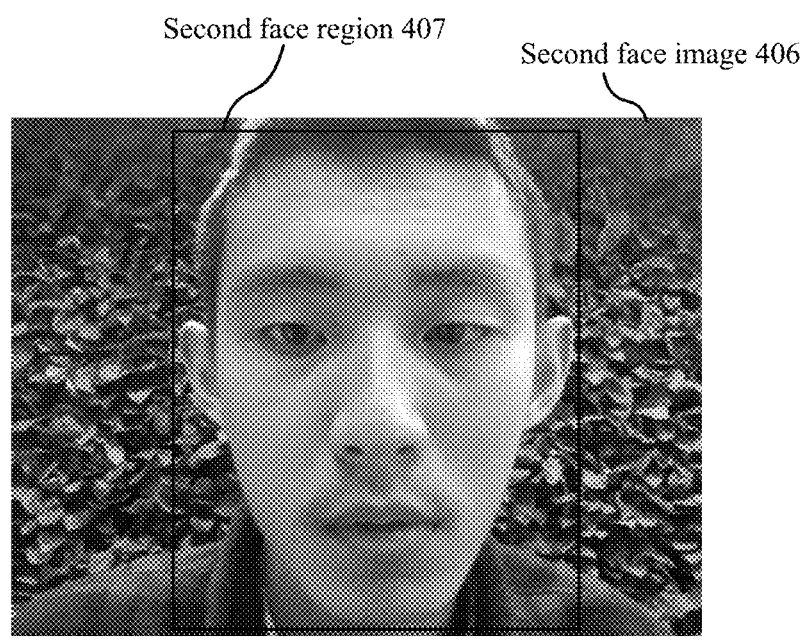
Figure 5A:
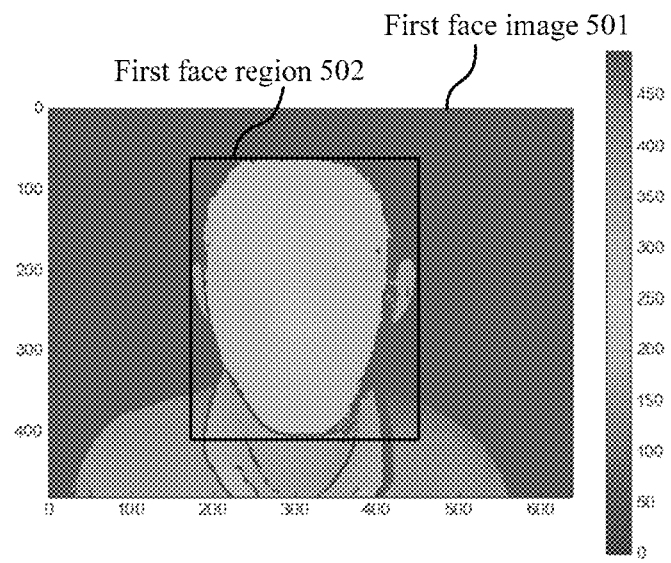
FIGS. 5A to 5C are a second schematic diagram illustrating the process of determining correspondence in the liveness detection method according to an embodiment of the present disclosure each.
Figure 5B:
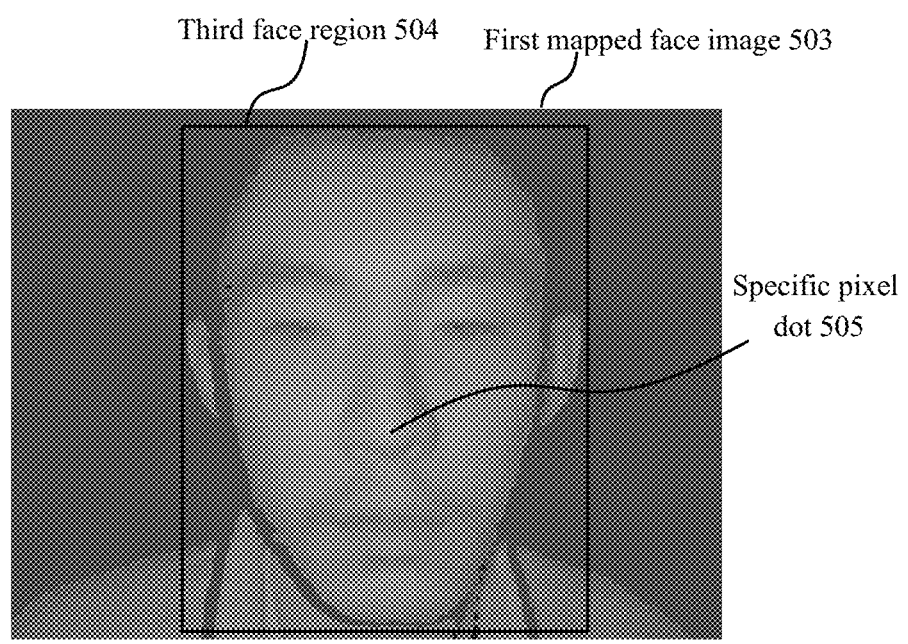
Figure 5C:
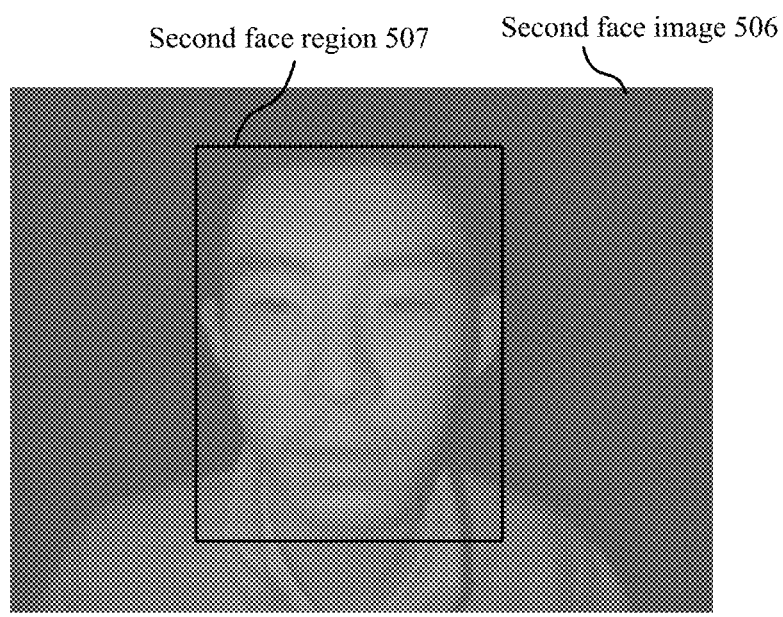

FIG. 3 is a flowchart further illustrating the process of determining correspondence between a two-dimensional face region and a depth face region in the liveness detection process according to an embodiment of the present disclosure. FIGS. 4A to 4C are a first schematic diagram illustrating the process of determining correspondence in the liveness detection method according to an embodiment of the present disclosure each. FIGS. 5A to 5C are a second schematic diagram illustrating the process of determining correspondence in the liveness detection method according to an embodiment of the present disclosure each.

As shown in FIG. 3, after the first face image data and the second face image data of the image to be detected are obtained, and the first face region where the first face in the first face image data resides and the second face region where the second face in the second face image resides are determined in steps S101 and S102 shown in FIG. 1, the processing proceeds to step S301, so as to further determine the correspondence between the first face region (the depth face region) and the second face region (the two-dimensional face region).

In step S301, based on mapping relationship, the first face image data is mapped into first mapped face image data in a pixel coordinate where the second face image data resides. In an embodiment of the present disclosure, the first face image data is depth image data, and the second face image data is the two-dimensional image data of RGB image data or infrared image data. A coordinate system used by the depth image is used as a reference coordinate system. As to a pixel located at a position (i, j) in the depth image, if its depth is z, then a three-dimensional position to which this pixel corresponds is $$v=(i \times z/F, j \times z/F, z)$$ (Expression 4)

where F is a ratio of a focal length of a camera and a size of a sensing element. It is supposed that a position of the two-dimensional image acquisition unit that acquires the two-dimensional image relative to the depth image acquisition unit that acquires the depth image is v0=(x0,y0,z0), a gesture rotation metric of the two-dimensional image acquisition unit is R, and a ratio of a focal length and a sensing element size is F2, then a method of calculating the corresponding pixel in the two-dimensional image of the pixel in the depth image is:

$$R(v-v0)=(ux, uy, uz)$$ (Expression 5)

the position of the corresponding pixel is $$(px, py)=(F2 \times ux/uz, F2 \times uy/uz)$$ (Expression 6)

It is supposed that a pixel value of the two-dimensional image at (px,py) is B[px,py], as to each (i, j), the above steps are performed, obtained pixel values of the corresponding positions are arranged as a new image A[ij]=B[px,py]. A[ij] is a mapped image obtained by mapping the depth image into the coordinate of the two-dimensional image pixel.

Reference is made to FIGS. 4A and 4B. FIG. 4A shows the first face image 401, the first face image 401 is a depth image having the first face region 402. By the mapping method described in step S301 with reference to FIG. 3, the first face image 401 is mapped to the pixel coordinate of the RGB image, to obtain the first mapped face image 403 shown in FIG. 4B.

Likewise, reference is made to FIGS. 5A and 5B. FIG. 5A shows the first face image 501, the first face image 501 is a depth image having the first face region 502. By the mapping method described in step S301 with reference to FIG. 3, the first face image 501 is mapped to the pixel coordinate of the infrared image, to obtain the first mapped face image 503 shown in FIG. 5B.

Reference is made back to FIG. 3. After the first mapped face image data is obtained in step S301, the processing proceeds to step S302.

In step S302, the third face region in the first mapped face image data and the second face region in the second face image data are determined by using a face detector that is trained in advance. In an embodiment of the present disclosure, the face detector that is trained in advance is configured with a Haar cascade classifier.

Reference is made to FIGS. 4B and 4C. As shown in FIG. 4B, the third face region 404 in the first mapped face image 403 is determined by using a face detector that is trained in advance. FIG. 4C shows the second face image 406, which is a two-dimensional RGB face image. As shown in FIG. 4, the second face region 407 in the second face image 406 is determined by using a face detector that is trained in advance.

Similarly, reference is made to FIGS. 5B and 5C. As shown in FIG. 5B, the third face region 504 in the first mapped face image 503 is determined by using a face detector that is trained in advance. FIG. 5C shows the second face image 506, which is a two-dimensional infrared face image. As shown in FIG. 5, the second face region 507 in the second face image 506 is determined by using a face detector that is trained in advance.

Reference is made back to FIG. 3. After the third face region and the second face region are determined in step S302, the processing proceeds to step S303.

In step S303, a specific pixel dot in the third face region is selected. In an embodiment of the present disclosure, a central pixel dot in the third face region is selected as the specific pixel dot.

Reference is made to FIGS. 4B an 5B, a central pixel dot in the third face region 404 and a central pixel dot in the third face region 504 are selected as the specific pixel dot 405 and the specific pixel dot 505, respectively.

Reference is made back to FIG. 3. After the specific pixel dot is selected in step S303, the processing proceeds to step S304.

In step S304, it is determined whether the specific pixel dot resides in the second face region.

If a positive result is obtained in step S304, i.e., the specific pixel dot resides in the second face region, then the processing proceeds to step S305. In step S305, it is determined that the first face region and the second face region correspond to each other. For example, if the pixel coordinate of the specific pixel dot 405 selected in FIG. 4B resides in the second face region 407 in FIG. 4C, then it is determined that the third face region 404 and the second face region 407 correspond to each other. Further, since the third face region 404 is obtained by performing pixel coordinate mapping from the first face region 402, then in the case where the third face region 404 and the second face region 407 correspond to each other, it is determined that the first face region 402 and the second face region 407 correspond to each other. That is to say, the first face region 402 in the first face image 401 which serves as the depth image and the second face region 407 in the second face image 406 which serves as the two-dimensional image correspond to the same object to be detected. Thereafter, the processing proceeds to step S104 described with reference to FIG. 1, so as to continue the liveness detection on the object to be detected.

Contrarily, if a negative result is obtained in step S304, i.e., the specific pixel dot does not reside in the second face region, then the processing proceeds to step S306. In step S306, since the first face region and the second face region do not correspond, i.e., there is no identical object to be detected in the depth image and the two-dimensional image, then the first face image data is neglected. Thereafter, the processing returns to step S101 described with reference to FIG. 1, to continuously obtain new first face image data and new second face image data of the object to be detected for detection.

The process of determining correspondence between the two-dimensional face region and the depth face region as contained in the liveness detection method according to an embodiment of the present disclosure has been described in the above with reference to FIGS. 3 to 5C. Next, liveness detection processing based on the two-dimensional classification result and the depth classification result as contained in the liveness detection method according to an embodiment of the present disclosure will be described in detail with reference to FIGS. 6 and 7.

Figure 6:
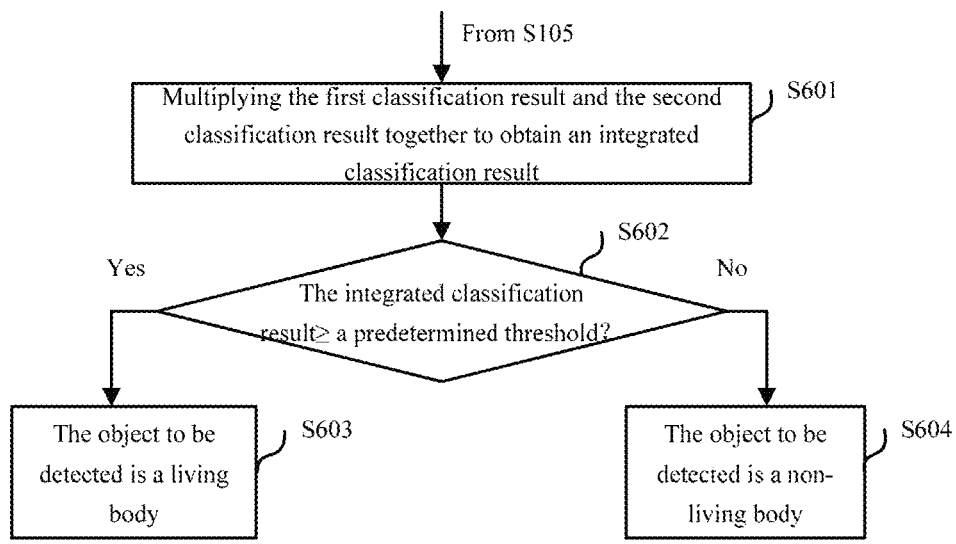
FIG. 6 is a first flowchart further illustrating the liveness detection processing based on the two-dimensional classification result and the depth classification result in the liveness detection method according to an embodiment of the present disclosure.

FIG. 6 is a first flowchart further illustrating the liveness detection processing based on the two-dimensional classification result and the depth classification result in the liveness detection method according to an embodiment of the present disclosure. As shown in FIG. 6, after the first classification result for the first face image and the second classification result for the second face image are determined by using corresponding different types of classifiers that have been trained with images in advance as described in step S105 with reference to FIG. 1, the processing proceeds to step S601 shown in FIG. 6.

In step S601, the first classification result and the second classification result are multiplied together to obtain an integrated classification result. In an embodiment of the present disclosure, the classifier that is trained in advance outputs a classification result between 0 and 1 with respect to an inputted face image. 0 indicates that the face image is a non-living body attacker such as a picture, a screen, a mask etc., 1 indicates that the face image is a normal face. The more closer to 1 the classification result is, it indicates that the higher the probability that the face image is a normal face is. Thereafter, the processing proceeds to step S602.

In step S602, it is detected whether the integrated classification result is not less than a predetermined threshold. In an embodiment of the present disclosure, a different predetermined threshold may be set according to a security level in a detection scenario.

If a positive result is obtained in step S602, i.e., the integrated classification result is not less than the predetermined threshold, then the processing proceeds to step S603. In step S603, it is determined that the object to be detected is a living body.

Contrarily, if a negative result is obtained in step S602, i.e., the integrated classification result is less than the predetermined threshold, then the processing proceeds to step S604. In step S604, it is determined that the object to be detected is a non-living body. In an embodiment of the present disclosure, since the integrated classification result is a product of multiplying the first classification result and the second classification result, thus if any one of the first classification result and the second classification result is 0, i.e. if any one of the two-dimensional image detection and the depth image detection does not pass, then it is determined that the object to be detected is a non-living body. In addition, even if the integrated classification result is not 0, if it is less than a predetermined threshold, it is also determined that the object to be detected is a non-living body based on an integration of the two-dimensional image detection and the depth image detection.

Figure 7:
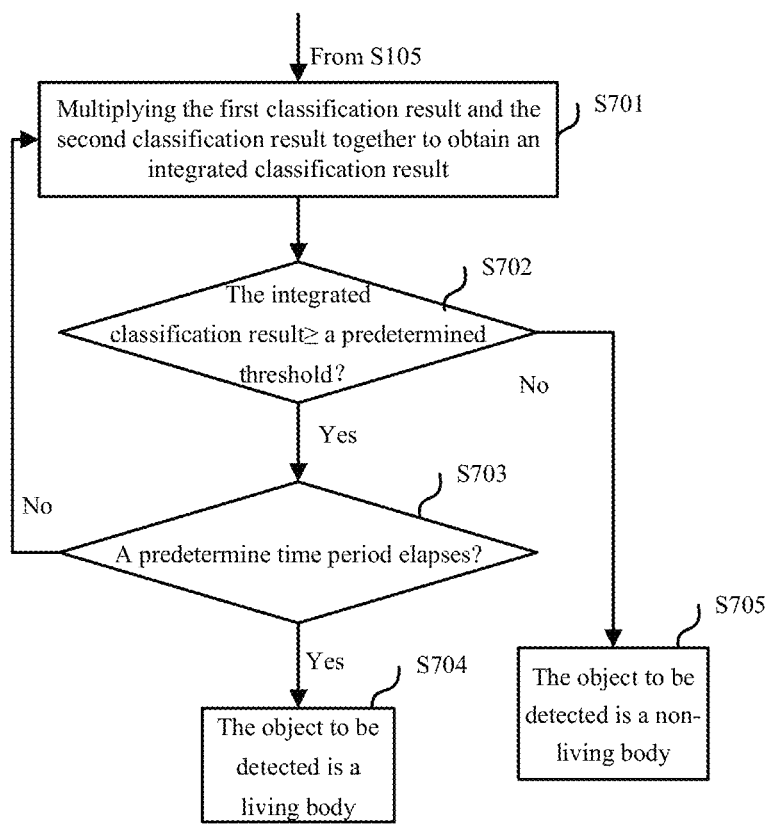
FIG. 7 is a second flowchart further illustrating the liveness detection processing based on a two-dimensional classification result and a depth classification result in the liveness detection method according to an embodiment of the present disclosure.

FIG. 7 is a second flowchart further illustrating the liveness detection processing based on a two-dimensional classification result and a depth classification result in the liveness detection method according to an embodiment of the present disclosure.

The second flowchart of the liveness detection processing shown in FIG. 7 differs from the first flowchart of the liveness detection processing shown in FIG. 6 in that when it is determined in step S702 that an integrated classification result in each frame is not less than a predetermined threshold, the processing further proceeds to step S703. In step S703, it is determined whether the integrated classification result in a predetermined time period is larger than or equal to the predetermined threshold for successive frames.

If a negative result is obtain in step S703, i.e., a determination result of being not less than the predetermined threshold is obtained for all the successive frames in the predetermined time period, then the processing proceeds to step S704, it is determined that the object to be detected is a living body.

Contrarily, if a negative result is obtained in step S703, the proceeding returns to step S701, so as to repeat the determination of the integrated classification result with respect to the image in the next successive frames.

Only when an integrated classification result for successive image frames in a predetermined time period indicates that the liveness detection is passed, the second flowchart of the liveness detection processing shown in FIG. 7 determines that the object to be detected passes the liveness detection, security of liveness detection is further improved in comparison to the first flowchart of the liveness detection processing shown in FIG. 6.

Figure 8:
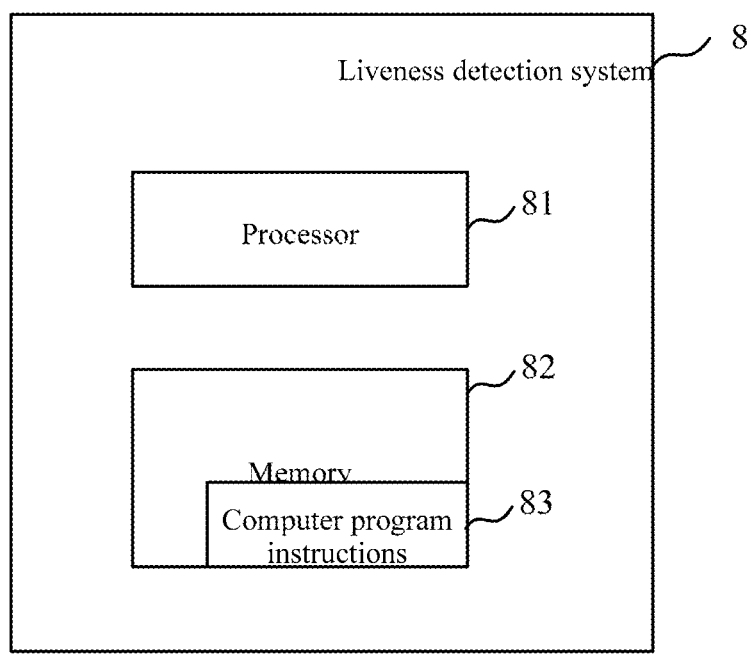
FIG. 8 is a schematic block diagram illustrating the liveness detection system according to an embodiment of the present disclosure.

FIG. 8 is a schematic block diagram illustrating the liveness detection system according to an embodiment of the present disclosure. As shown in FIG. 8, the liveness detection system 8 according to an embodiment of the present disclosure comprises: a processor 81, a memory 82, and computer program instructions 83 stored in the memory 82.

The computer program instructions 83 can achieve functions of respective functional modules of the liveness detection system according to an embodiment of the present disclosure and/or execute respective steps of the liveness detection method according to an embodiment of the present disclosure, when being run by the processor 81.

Specifically, the computer program instructions 83 are configured to cause the liveness detection system 8 to execute the following steps when being run by the processor: obtaining first face image data and second face image data of an object to be detected, the first face image data and the second face image data being acquired respectively by a first image acquisition unit and a second image acquisition unit, and at least one of the first face image data and the second face image data being a depth image; determining a first face region where a first face resides in the first face image data and a second face region where a second face resides in the second face image data, determining whether the first face region and the second face region correspond to each other, and extracting, when it is determined that the first face region and the second face region correspond to each other, a first face image and a second face image from the first face region and the second face region that correspond to each other, respectively; determining a first classification result for the extracted first face image and a second classification result for the extracted second face image by using a first classification unit for the first face image data and a second classification unit for the second face image data; and determining, based on the first classification result and the second classification result, a detection result for the object to be detected.

In addition, the computer program instructions 83 are configured to further cause the liveness detection system 8 to execute the following steps when being run by the processor: mapping, based on pixel position mapping relationship between the first face image data and the second face image data, the first face image data into first mapped face image data in a pixel coordinate where the second face image data resides; and determining, by using a face detector that is trained in advance, a third face region in the first mapped face image data and the second face region in the second face image data, and determining, based on the third face region in the first mapped face image data, the first face region in the first face image data.

In addition, the computer program instructions 83 are configured to further cause the liveness detection system 8 to execute the following steps when being run by the processor: selecting a specific pixel dot in the first face region; determining whether the specific pixel dot resides in the second face region according to pixel position mapping between the first face image data and the second face image data; and determining that the first face region and the second face region correspond to each other when the specific pixel dot resides in the second face region.

In addition, the computer program instructions 83 are configured to further cause the liveness detection system 8 to execute the following steps when being run by the processor: training the first classification unit and the second classification unit in advance by using a plurality of different types of sample images, wherein a weight of each of the plurality of different types of sample images with respect to the first classification unit and the second classification unit is adjusted dynamically.

In addition, the computer program instructions 83 are configured to further cause the liveness detection system 8 to execute the following steps when being run by the processor: multiplying the first classification result and the second classification result together to obtain an integrated classification result; and comparing the integrated classification result to a predetermined threshold, indicating that the liveness detection is passed if the integrated classification result is larger than or equal to the predetermined threshold, the first classification result and the second classification result are a value between 0 and 1 each.

In addition, the computer program instructions 83 are configured to further cause the liveness detection system 8 to execute the following steps when being run by the processor: indicating that the liveness detection is passed when the integrated classification result in a predetermined time period is larger than or equal to the predetermined threshold.

Respective modules in the liveness detection system according to an embodiment of the present disclosure may be implemented by that the processor in the liveness detection system according to an embodiment of the present disclosure run the computer program instructions stored in the memory, or may be implemented by that the computer program instructions stored in the computer-readable storage medium of the computer program product according to an embodiment of the present disclosure are run by a computer.

The computer-readable storage medium may be any combination of one or more computer-readable storage mediums, e.g., a computer-readable storage medium containing computer-readable program codes for randomly generating action instruction sequences, another computer-readable storage medium containing computer-readable program codes for carrying out authentication on face activities.

The computer-readable storage medium may for example include a memory card of a smart phone, a storage unit of a tablet computer, a hard disk of a personal computer, a random access memory (RAM), a read only memory (ROM), an erasable programmable read-only memory (EPROM), a portable compact disc read-only memory (CD-ROM), a USB memory, or a combination of any the aforesaid storage mediums.

Exemplary embodiments of the present disclosure as described in detail in the above are merely illustrative, rather than limitative. However, those skilled in the art should understand that, various modifications, combinations or sub-combinations may be made to these embodiments without departing from the principles and spirits of the present disclosure, and such modifications are intended to fall within the scope of the present disclosure.

What is claimed is:

1. A liveness detection method, comprising:
obtaining first face image data and second face image data of an object to be detected simultaneously, the first face image data and the second face image data being acquired respectively by a first image acquisition unit and a second image acquisition unit, and at least one of the first face image data and the second face image data being a depth image;
determining a first face region where a first face resides in the first face image data and a second face region where a second face resides in the second face image data, determining whether the first face region and the second face region correspond to each other, and extracting, when it is determined that the first face region and the second face region correspond to each other, a first face image and a second face image from the first face region and the second face region that correspond to each other, respectively;

determining a first classification result for the extracted first face image and a second classification result for the extracted second face image by using a first classification unit for the first face image data and a second classification unit for the second face image data; and determining, based on the first classification result and the second classification result, a detection result for the object to be detected, wherein determining the first face region where the first face in the first face image data resides and the second face region where the second face in the second face image data resides comprises:

mapping, based on pixel position mapping relationship between the first face image data and the second face image data, the first face image data into first mapped face image data in a pixel coordinate where the second face image data resides; and determining, by using a face detector that is trained in advance, a third face region in the first mapped face image data and the second face region in the second face image data, and determining, based on the third face region in the first mapped face image data, the first face region in the first face image data, and wherein determining whether the first face region and the second face region correspond to each other comprises:

selecting a specific pixel dot in the first face region;

determining whether the specific pixel dot resides in the second face region according to pixel position mapping between the first face image data and the second face image data, wherein the pixel position mapping between the first face image data and the second face image data is determined based on a relative position between the first image acquisition unit and the second image acquisition unit, a pixel position of the specific pixel dot is mapped to a pixel coordinate where the second face image data resides according to the pixel position mapping and if the pixel position of the specific pixel dot in the pixel coordinate where the second face image data resides is in the second face region, it is determined that the specific pixel dot resides in the second face region; and determining that the first face region and the second face region correspond to each other when the specific pixel dot resides in the second face region.

2. The liveness detection method as claimed in claim 1, wherein the first image acquisition unit is a depth image acquisition unit, and the second image acquisition unit is a two-dimensional image acquisition unit.

3. The liveness detection method as claimed in claim 1, wherein in the case that the first face region and the second face region do not correspond, the method further comprising:

obtaining another first face image data and another second face image data of the object to be detected simultaneously, wherein the first face region and the second face region do not correspond includes at least one of:

one or two of the first face image data and the second face image data includes no face region, and after the first face region in the first face image data and the second face region in the second face image data are mapped into a same coordinate, the mapped first face region and the mapped second face region have a difference that exceeds a predetermined threshold in a specific position in the coordinate.

4. The liveness detection method as claimed in claim 1, further comprising:

training the first classification unit and the second classification unit in advance by using a plurality of different types of sample images, wherein a weight of each of the plurality of different types of sample images with respect to the first classification unit and the second classification unit is adjusted dynamically.

5. The liveness detection method as claimed in claim 1, wherein determining, based on the first classification result and the second classification result, a detection result for the object to be detected comprises:

multiplying the first classification result and the second classification result together to obtain an integrated classification result; and comparing the integrated classification result to a predetermined threshold, indicating that the liveness detection is passed if the integrated classification result is larger than or equal to the predetermined threshold, the first classification result and the second classification result are a value between 0 and 1 each.

6. The liveness detection method as claimed in claim 5, wherein determining, based on the first classification result and the second classification result, a detection result for the object to be detected further comprises:

indicating that the liveness detection is passed when the integrated classification result in a predetermined time period is larger than or equal to the predetermined threshold.

7. A liveness detection system, comprising:

an image data acquisition module for acquiring first face image data and second face image data of an object to be detected simultaneously;

a liveness detection module for performing liveness detection based on the first face image data and the second face image data, and including:

a face region correspondence determination module for determining a first face region where a first face resides in the first face image data and a second face region where a second face resides in the second face image data, and determining whether the first face region and the second face region correspond to each other;

a face image extraction module for extracting, when it is determined that the first face region and the second face region correspond to each other, a first face image and a second face image from the first face region and the second face region that correspond to each other;

a first classification unit for determining a first classification result for the first face image;

a second classification unit for determining a second classification result for the second face image; and a classification result detection unit for determining a detection result for the object to be detected based on the first classification result and the second classification result, wherein the face region correspondence determination module is for:

mapping, based on pixel position mapping relationship between the first face image data and the second face image data, the first face image data into first mapped face image data in a pixel coordinate where the second face image data resides, determining a third face region in the first mapped face image data and the second face region in the second face image data, and determining the first face region in the first face image data based on the third face region in the first mapped face image data, wherein the face region correspondence determination module is further for:

selecting a specific pixel dot in the first face region;

determining whether the specific pixel dot resides in the second face region according to pixel position mapping between the first face image data and the second face image data, wherein the pixel position mapping between the first face image data and the second face image data is determined based on a relative position between the first image acquisition unit and the second image acquisition unit, a pixel position of the specific pixel dot is mapped to a pixel coordinate where the second face image data resides according to the pixel position mapping and if the pixel position of the specific pixel dot in the pixel coordinate where the second face image data resides is in the second face region, it is determined that the specific pixel dot resides in the second face region; and determining that the first face region and the second face region correspond to each other when the specific pixel dot resides in the second face region.

8. The liveness detection system as claimed in claim 7, further comprising:

a first image acquisition unit for acquiring the first face image data and a second image acquisition unit for acquiring the second face image data, respectively, wherein the first image acquisition unit is a depth image acquisition unit, and the second image acquisition unit is a two-dimensional image acquisition unit.

9. The liveness detection system as claimed in claim 7, wherein the classification result detection unit is for:

multiplying the first classification result and the second classification result together to obtain an integrated classification result; and comparing the integrated classification result to a predetermined threshold, indicating that the liveness detection is passed if the integrated classification result is larger than or equal to the predetermined threshold, the first classification result and the second classification result being a value between 0 and 1 each.

10. The liveness detection system as claimed in claim 9, wherein the classification result detection unit determines whether the integrated classification result in a predetermined time period is larger than or equals to the predetermined threshold, and indicates that the liveness detection is passed when the integrated classification result in the predetermined time period is larger than or equal to the predetermined threshold.

11. A liveness detection device, comprising:

a processor;

a memory; and computer program instructions stored in the memory and configured to execute the following steps when being run by the processor:

obtaining first face image data and second face image data of an object to be detected simultaneously, the first face image data and the second face image data being acquired respectively by a first image acquisition unit and a second image acquisition unit, and at least one of the first face image data and the second face image data being a depth image;

determining a first face region where a first face resides in the first face image data and a second face region where a second face resides in the second face image data, determining whether the first face region and the second face region correspond to each other, and extracting, when it is determined that the first face region and the second face region correspond to each other, a first face image and a second face image from the first face region and the second face region that correspond to each other, respectively;

determining a first classification result for the extracted first face image and a second classification result for the extracted second face image by using a first classification unit for the first face image data and a second classification unit for the second face image data; and determining, based on the first classification result and the second classification result, a detection result for the object to be detected, wherein the step of determining the first face region where the first face in the first face image data resides and the second face region where the second face in the second face image data resides comprises:

mapping, based on pixel position mapping relationship between the first face image data and the second face image data, the first face image data into first mapped face image data in a pixel coordinate where the second face image data resides; and determining, by using a face detector that is trained in advance, a third face region in the first mapped face image data and the second face region in the second face image data, and determining, based on the third face region in the first mapped face image data, the first face region in the first face image data, and wherein the step of determining whether the first face region and the second face region correspond to each other executed when the computer program instructions are run by the processor comprises:

selecting a specific pixel dot in the first face region;

determining whether the specific pixel dot resides in the second face region according to pixel position mapping between the first face image data and the second face image data, wherein the pixel position mapping between the first face image data and the second face image data is determined based on a relative position between the first image acquisition unit and the second image acquisition unit, a pixel position of the specific pixel dot is mapped to a pixel coordinate where the second face image data resides according to the pixel position mapping and if the pixel position of the specific pixel dot in the pixel coordinate where the second face image data resides is in the second face region, it is determined that the specific pixel dot resides in the second face region; and determining that the first face region and the second face region correspond to each other when the specific pixel dot resides in the second face region.

12. The liveness detection device as claimed in claim 11, wherein the step of determining, based on the first classification result and the second classification result, a detection result for the object to be detected executed when the computer program instructions are run by the processor comprises:

multiplying the first classification result and the second classification result together to obtain an integrated classification result;

comparing the integrated classification result to a predetermined threshold, indicating that the liveness detection is passed if the integrated classification result is larger than or equal to the predetermined threshold, the first classification result and the second classification result are a value between 0 and 1 each; and indicating that the liveness detection is passed when the integrated classification result in a predetermined time period is larger than or equal to the predetermined threshold.

\* \* \* \* \*